Patented Aug. 13, 1929.

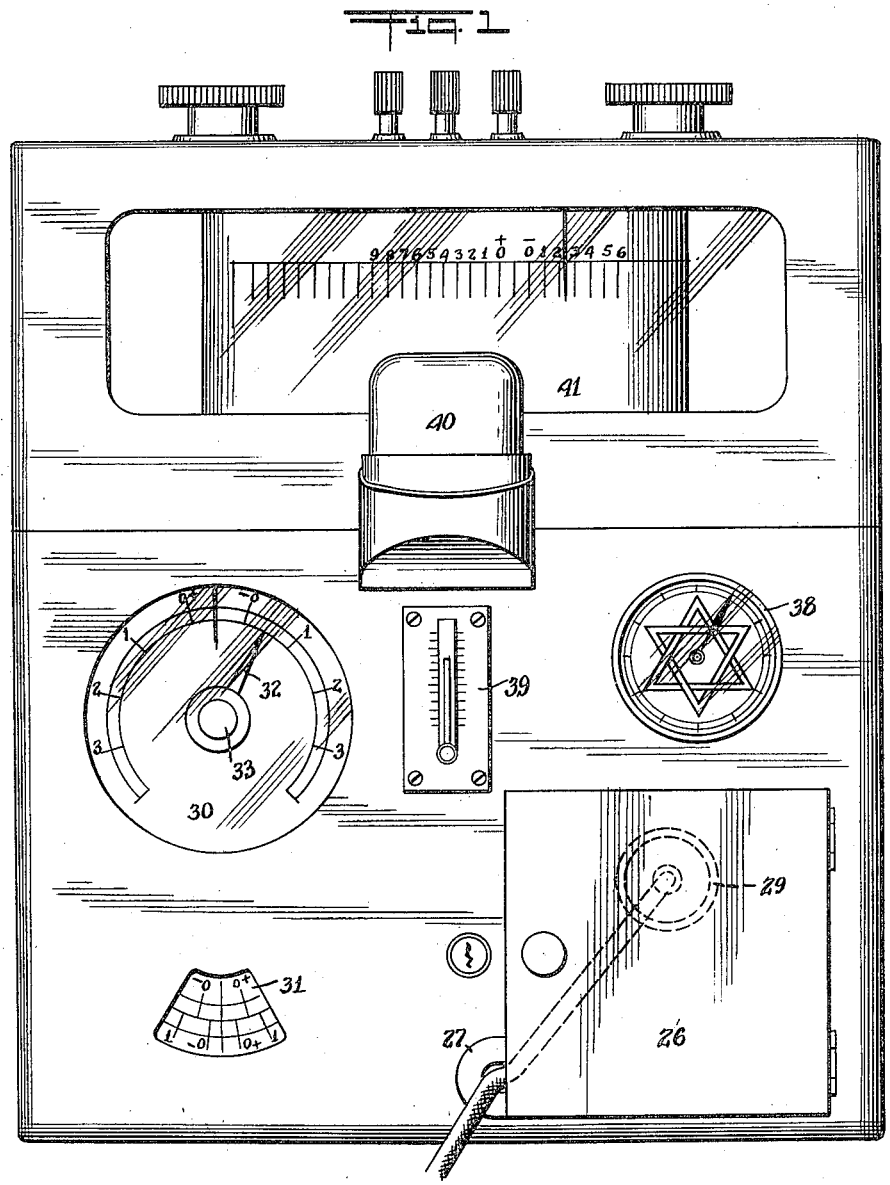

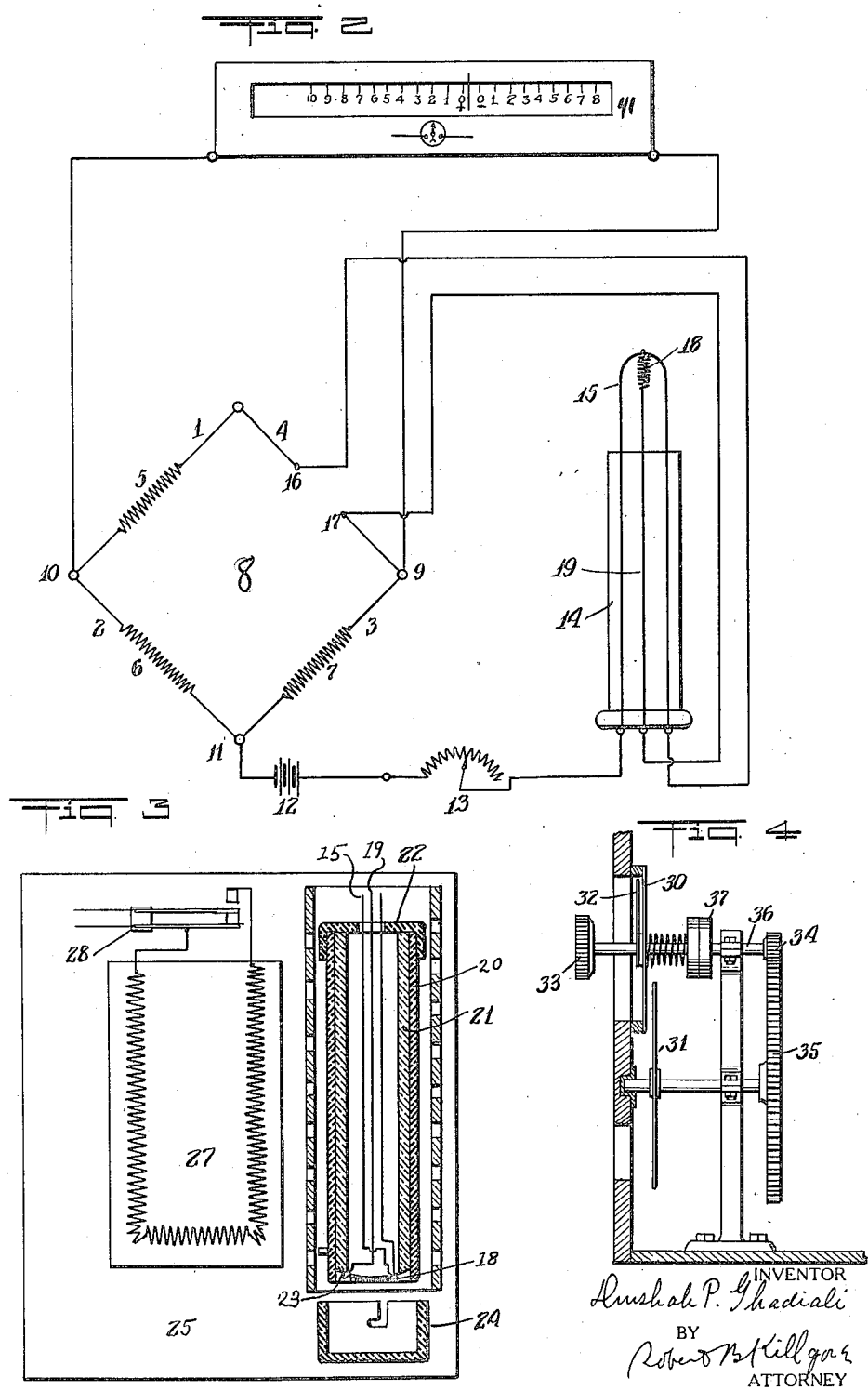

1,724,469

UNITED STATES PATENT OFFICE.

DINSHAH P. GHADIALI, OF MALAGA, NEW JERSEY.

ELECTRIC THERMOMETER.

Application filed July 20, 1926. Serial No. 123,786.

My apparatus is a device for electrically measuring the temperature of the various parts of the human body to determine which of said parts are above or below the normal temperature for that portion of the body, and to calculate mechanically from the readings so taken the average of various areas and of the entire body. Also to provide means whereby the electric thermometer is ready at all times to perform its functions and to provide a time keeping device which will determine standard observations.

In the drawing Fig. 1 is a front view of my complete apparatus; Fig. 2 a diagram of the circuit of the electric thermometer proper; Fig. 3 a plan view of the warming chamber, with its element, thermostat, tube and body contact device; and Fig. 4 a sectional view of the calculating device.

The instrument, mounted in a suitable cabinet, consists of four principal parts, the electric thermometer, the calculating device, the time keeping device and the warming chamber for the body contact device.

The electric thermometer comprises a Wheatstone bridge and a galvanometer. As shown in Fig. 2 the bridge consists of four legs 1, 2, 3 and 4. The legs 1, 2 and 3 have the fixed resistances 5, 6 and 7 therein while the leg 4 has a special form of variable resistance later described herein. The galvanometer 41, of the well known moving coil type, is connected to the points 9 and 10 of the bridge. The lead from point 11 leads to a battery 12 and rheostat 13, thence to the body contact device or variable bridge resistance 14. This body contact device has the lead from the rheostat passing through it as an open loop 15 to equalize the lead lengths and avoid errors due to different line resistances and is connected to the leg 4 at 16. The other side of the open leg 4 is connected to the bottom of the loop 15 by a lead 19 but the connection is made through a high resistance 18 made of fine platinum wire.

The body contact device 14, as shown in section in Fig. 3, comprises an outer case 20 of dielectric material, a lining in the form of a relatively thick metal tube 21 and an end 22 secured thereto. The lead wires 15 and 19 pass through the tube 21 but out of electric contact therewith. The lower, or open end of the body contact member has a domed piece 23 of dielectric material seated slightly inside the end of the tube end and the high resistance 18 is affixed to the exposed surface. A cap 24 is provided to cover the tube 21 when the body contact is not in use to protect the resistance wire from mechanical injury as well as to conserve the heat. The body contact is normally stored in a warmed chamber 25, closed by a door 26 with an outlet 27 formed in the cabinet beside the door to permit the passage of the lead wires 18 and 19 when the instrument is not in use and the door is closed to conserve the heat in the chamber.

The chamber 25 has a heating element 27, controlled by a thermostat 28, to maintain the chamber at a suitable temperature corresponding to the average normal temperature of the human body.

The body contact device 14 is stored inside the chamber in a heavy metal tube 29 which holds the heat better than if it is simply exposed to the air.

The calculating device comprises a stationary dial 30 and a rotatable dial 31. A pointer 32, provided with an operating button 33 can be revolved over the dial 30, and by means of gears 34 and 35 the motion of the pointer is transmitted to and revolves the dial 31, a portion of which is visible through an opening in the cabinet, as shown in Fig. 1.

The pointer shaft 36 is made in two sections with a disk on the meeting end of each section and a spring on the section carrying the button 33 which normally holds the two disks in frictional engagement as shown in Fig. 4 but which permits the rotation of the pointer 32 without turning the gears or lower dial by pulling out on the button, thereby breaking the transmission line. Other coupling means may be substituted without departing from the scope of my invention.

In order that a uniform time of application of the body contact 14 may be conveniently made I provide a special clock 38 in which one revolution of the hand indicates a standard period of time and the dial may be divided into suitable divisions.

As the instrument is so sensitive it is calibrated to be accurate at room temperatures and in order that this condition may be assured a thermometer 39 is secured to the instrument to measure such room temperature.

A small electric light in housing 40 illuminates the galvanometer dial.

The galvanometer dial 41 is graduated with a base line and a — and a +0 on either side thereof, the remaining graduations being + and — 1, 2, 3, 4, etc., reading to the right and left of the zeros.

The galvanometer dial graduations are repeated on the dial 30 in circular form and also on the dial 31, but reversed from left to right.

The method of use of the instrument is as follows:—The chamber 25 is warmed with the body contact enclosed therein. The galvanometer is tested to ascertain whether the battery 12 is strong enough to move the galvanometer needle over the entire scale. The needle is then brought to the base line between the + and — zeros. These operations are common to all galvanometers and it is not necessary to describe the mechanism by which they are performed. If, in testing, the galvanometer needle swings off the scale on the right, or cool, end of the scale the instrument is too cold, and further warming must take place. The fluctuation of the needle between the + and — zeros, which represent the normal variations in the temperatures of the bodies of different individuals, determine whether the individual under test has a high or low initial reading.

To determine the base, or starting temperature, the end of the body contact is first covered with thin paper to protect the resistance wire and the contact is then firmly, but gently, pressed to different portions of the body and the galvanometer readings noted and recorded.

The contact is then successively applied to the various parts or areas of the body and like readings and notations made. The local area records is read directly from the galvanometer dial and proper corrective measures are indicated thereby. The time of applying the body contact is determined by experiment and should be uniform.

To calculate the resultant temperature readings the pointer over the upper dial is turned until the base line on the lower dial is under the sight line. The clutch is then released and the pointer on the upper dial revolved until it is over the base line on the upper dial. The upper dial pointer is then connected to the gearing and lower dial by releasing the button so that the upper dial pointer and the lower dial will revolve together. The head readings previously taken and noted down are then averaged by successively turning the pointer to the right or left to the proper graduations corresponding to the previously taken and noted readings of the galvanometer. The pointer is returned to the base line after each movement but the pointer must be pulled out to declutch the lower dial mechanism before the return movement. The average or resultant of the readings will then be shown on the lower dial and will show whether the temperature of the individual is sub-normal or supernormal.

If the base temperature, so determined, is supernormal the plus zero is used as the base line in all subsequent calculations, and if the temperature is subnormal the minus zero is used as the base line. This automatically compensates for personal vagaries in the subsequent calculations. The readings for the various areas of the body are then calculated by groups in like manner so that the general temperature of large areas may be determined. By obtaining the resultant of the total of the area resultants the general resultant temperature of the body may be calculated and ascertained. Supernormal temperatures naturally indicate excessive functioning and subnormal temperatures indicate deficient functioning. Corrective measures, both systemic and local, may then be applied.

The body contact should be kept in the chamber at all times when not in actual use but should it become so cooled in use that a test shows that it swings the galvanometer needle off the — scale it may be quickly warmed by holding it over the lamp housing for a few seconds or other independent source of heat. Such source may be mounted directly in the body contact itself.

By the use of this instrument the precise condition of all the various parts of the body may be determined and corrective measures indicated and the general condition, by larger areas and as a whole may be calculated.

I claim:—

An instrument for determining temperatures comprising a Wheatstone bridge, a galvanometer, a variable resistance unit comprising a dielectric case, a metallic tube therein, a dielectric filling piece adjacent the open end of said case, a variable resistance on said filling piece, a heating chamber adapted to contain the variable resistance unit, a heating element in said chamber and a thermostat within the chamber controlling the heating element, whereby a constant temperature is maintained on said variable resistance unit.

In testimony whereof I have hereunto affixed my signature.

DINSHAH P. GHADIALI.